May 6, 1969      K. E. SUNDSTROM      3,443,089
RADIANT ENERGY ANALYZER FOR DIRECTLY MEASURING THE
POLARIZATION RATIO OF FLUORESCENT RADIATION
Filed June 20, 1966

INVENTOR.
KARL ERIK SUNDSTROM
BY

*Paul R Harder*

ATTORNEY

United States Patent Office 3,443,089
Patented May 6, 1969

3,443,089
RADIANT ENERGY ANALYZER FOR DIRECTLY MEASURING THE POLARIZATION RATIO OF FLUORESCENT RADIATION
Karl Erik Sundstrom, Chene-Bougeries, Geneva, Switzerland, assignor to Beckman Instruments, Inc., a corporation of California
Filed June 20, 1966, Ser. No. 558,643
Int. Cl. G01n 21/26, 23/12
U.S. Cl. 250—43.5    3 Claims

ABSTRACT OF THE DISCLOSURE

An improved analyzer capable of recording directly the polarization ratio of fluorescent radiation is disclosed. A double beam ratio recording spectrophotometer of the type illustrated in U.S. Patent 2,868,060 is modified to allow fluorescent measurements in the reference and sample beam paths. The reference and sample signal channels are modified by interconnecting the storage capacitors through equal resistors to form a junction to provide a signal proportional to the average or D.C. value of the detector output. This signal is fed back to control the dynode voltage of the photomultiplier to maintain the average constant. By setting the analyzer in one beam path 90° out of phase with the analyzer in the other beam path the resulting signal in the sample channel will be directly proportional to the polarization ratio.

---

This invention relates generally to radiant energy analyzers and more particularly to new and improved analyzers capable of recording directly the polarization ratio of fluorescent radiation.

Fluorescent radiation emitted by samples in many cases is polarized. A study of the polarization of this radiation provides information relating to the spatial properties of electron transitions in molecules, the mobility of the molecule or a portion of the molecule and the lifetime of the excited state.

It is customary to express the polarization of a fluorescing sample in terms of the polarization ratio:

$$P = I_{11} - I_1 / I_{11} + I_1$$

where $I_{11}$ is the intensity of the fluorescent radiation parallel to the plane of plane-polarized exciting radiation and $I_1$ is the intensity of fluorescent radiation perpendicular to the plane of the plane-polarized exciting radiation. That is to say, $I_{11}$ and $I_1$ are the intensities of the radiation parallel and perpendicular to the electric vector E of the excitation radiation.

Conventional methods of obtaining polarized spectra have been slow and cumbersome. In the past it has been the practice to record $I_{11}$ as a function of wavelength and make a second recording of $I_1$, reducing this information to obtain the polarization ratio P manually. More recently, automatic means have been developed for obtaining this ratio directly by providing an analyzer in the fluorescent beam and continuously rotating the analyzer at a rate that is relatively fast compared to the scanning rate. The output of the detector is an A.C. signal having a frequency twice the mechanical rotational frequency of the analyzer and the magnitude of the A.C. signal is proportional to the numerator of P or $I_{11}-I_1$. The average or D.C. value of the detector output is proportional to the denominator or the sum of the two components. By special filtering, signals proportional to the difference and sum of the parallel and perpendicular intensity components may be derived which can be ratioed by conventional means. This method requires special circuitry not generally found in conventional spectrophotometers and is somewhat expensive compared to the present invention.

In one type of double beam ratio recording spectrophotometer in use at the present time, there is provided a vibrating mirror assembly switching radiation alternately along reference and sample beam paths. A photomultiplier detector is utilized and the intensity of the radiation during the reference period is utilized to provide a system which is independent of variations in the incident radiation. The reference signal is fed back to control the dynode voltage of the photomultiplier to maintain the reference signal constant. The signal available in the other channel is then proportional to the ratio of the radiation transmitted by the sample to that transmitted by the reference or sample transmitance.

The present invention provides a convenient means with only minor modifications of this standard double beam ratio recording system for the direct recording of the polarization ratio.

Figure 1:
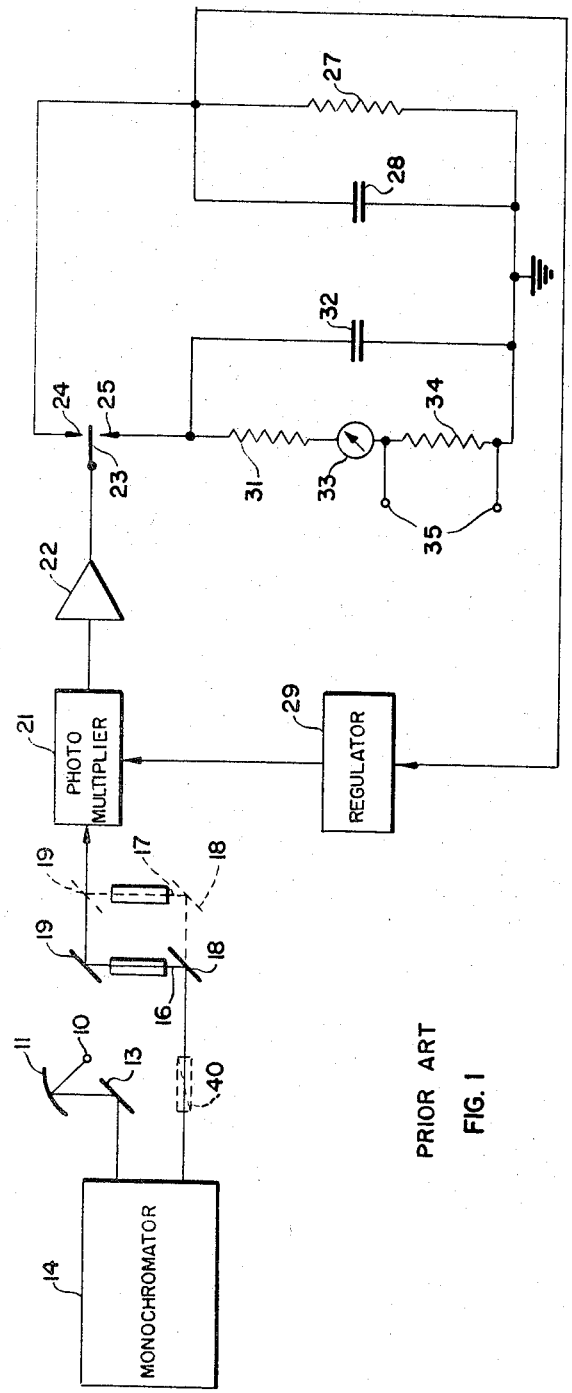
FIG. 1 is a schematic diagram of the ratio recording spectrophotometer known in the prior art.

Referring now to FIG. 1 radiant energy from source 10 is directed by focusing mirror 11 and flat mirror 13 to the entrance slit of monochromator 14 which disperses the radiant energy and scans a selected wavelength past the exit slit in a conventional manner. Dispersed radiation from the exit slit is alternately switched along a sample beam path 16 and reference beam path 17 by a pair of vibrating mirrors 18 and 19. Radiation passing the reference and sample cells is focused on a photomultiplier 21 which provides an output signal proportional to the intensity of the instantaneous incident radiation. The output of the photomultiplier is amplified in amplifier 22 and applied to a signal sorter comprising armature 23 and fixed contacts 24 and 25. The signal sorter is operated in synchronism with the vibrating mirror assembly and armature 23 is in contact with fixed contact 24 during the reference period and in contact with fixed contact 25 during the sample period. Thus, a signal proportional to the intensity of the radiation in the reference beam path appears across resistor 27 and capacitor 28 which act as a filter circuit. The reference signal stored across capacitor 28 is applied to a voltage regulator 29 where it is compared with a fixed reference to provide an error signal utilized to control the voltage on the dynodes of photomultiplier 21. The regulator 29 is arranged in such a manner as to maintain the reference signal output of photomultiplier 21 substantially constant by regulating the voltage on the photomultiplier dynodes. If this voltage is maintained during the sample period the signal applied to resistors 31 and 34 and capacitor 32 when armature 23 contacts fixed contact 25 during the sample period will be equal to the ratio of the radiation impinging upon the photomultiplier from the sample to that impinging from the reference or sample transmittance. This signal may be applied to any suitable indicating device 33. Since the current flowing through resistors 31 and 34 is proportional to sample transmittance, the voltage across resistor 34 may be provided to any suitable recording device via terminal 35. For a more complete explanation of the foregoing prior art system and for a detailed explanation of a suitable vibrating mirror assembly for use therein reference is made to U.S. Patent No. 2,868,060, dated Jan. 13, 1959, and assigned to the assignee of the instant invention.

With minor modification, the foregoing prior art ratio recording spectrophotometer may be modified so as to directly record polarized fluorescence.

Figure 2:
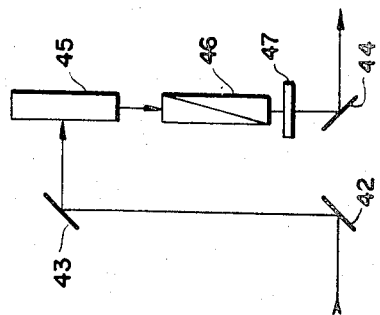
FIG. 2 illustrates the modification to the optical arrangement to provide fluorescent radiant energy signals at the detector.

Referring now to FIG. 2 there is illustrated an adapter for use in the reference and sample beam paths 16 and 17 to provide appropirate fluorescent radiation at photomultiplier 21. In converting the prior art radiant energy analyzer for the direct recording of polarized fluorescence a polarizer may be placed in the excitation beam path as indicated at 40 in FIG. 1. The polarizer may be oriented to plane-polarize radiation in any desired plane in the excitation beam path. In converting the prior art spectrophotometer two adapters must be utilized, one in the sample beam compartment and the other in the reference beam compartment. Each adapter is identical to that illustrated in FIG. 2 and comprises mirrors 42, 43 and 44, cell 45 and a polarizer 46. Radiant energy directed along either the reference or sample beam paths by the vibrating mirror assemblies is directed by mirrors 42 and 43 to the cell 45. Fluorescent radiation from the sample within the cell 45 passed by analyzer 46 and filter 47 is directed by mirror 44 along the original reference or sample beam path. The analyzer in the one beam path is set 90° out of phase with the analyzer in the other beam path. Filter 47 is selected to have a band pass which will pass only the fluorescent radiation from the sample thereby eliminating excitation radiation in the fluorescent beam path due to scattering of the sample and other stray radiation. Both cells are filled with sample solution rather than a sample solution and a solvent or reference solution as is the normal case in the ratio recording spectrophotometer. Let it be assumed that the analyzer in the reference path is set parallel to the plane of the plane-polarized excitation radiation and the analyzer in the sample beam is set perpendicular thereto. During the sample period the radiant energy signal at the photomultiplier is the fluorescent radiation from the sample that is polarized perpendicular to the plane-polarized excitation radiation or $I_1$. During the reference period the radiant energy at the photomultiplier is the fluorescent radiation from the sample polarized parallel to the plane of the plane-polarized excitation radiation or $I_{11}$.

Figure 3:
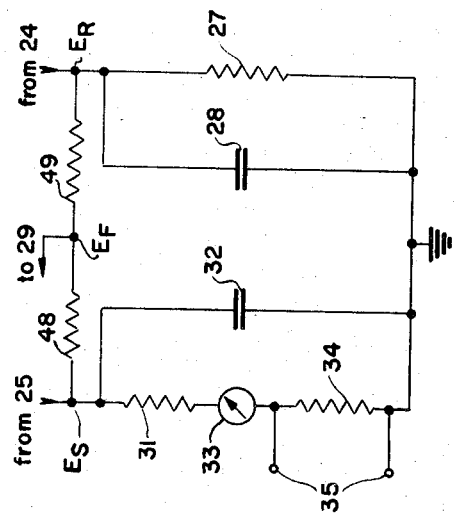
FIG. 3 illustrates the modification to the circuit to provide directly the polarization ratio.

Referring now to FIG. 3 there is illustrated a modification of the circuit of FIG. 1 which, together with the adapters of FIG. 2, allows direct recording of the polarization ratio. Parts of FIG. 3 which are common to FIG. 1 contain like reference numerals and similar function. Resistors 48 and 49 are added and interconnect the two signal channels and the dynode feedback signal $E_F$ is taken from their common junction. Resistors 48 and 49 are most conveniently selected to have equal resistance therefore $$E_F = E_S + E_R / 2 \tag{1}$$

If we initially set the analyzer in the reference and sample beam paths in the same plane the initial signals $E_{S_0}$ and $E_{R_0}$ will be equal since both cells contain the sample. Thus $$E_{S_0} = E_{R_0} \tag{2}$$

Further, if the signal $E_F$ is fed back to the dynodes, the feedback circuit will operate to hold $E_F$ constant. From Equations 1 and 2 we see that $$E_{F_0} = E_{S_0} \tag{3}$$

but since the feedback circuit operates to maintain $E_F$ a constant we can say that $$E_F = E_{F_0} = E_{S_0} \tag{4}$$

The voltage signal $E_{34}$ across resistor 34 applied to an auxiliary recorder is represented by the general equation $$E_{34} = E_{34} I \tag{5}$$

where I is the current through resistors 31, 34 and meter 33.

The initial signal to the recorder then will be $$E_{34_0} = R_{34} I_0 \tag{6}$$

Let R be the total resistance in the sample channel across which $E_S$ is applied. Therefore, $$R = R_{31} + R_{33} + R_{34} \tag{7}$$

where $R_{33}$ is the resistance of meter 33.

The initial current is $$I_0 = E_{S_0}/R \tag{8}$$

and from Equation 4 we have $$I_0 = E_F/R \tag{9}$$

Substituting Equation 9 in Equation 6 we have $$E_{34_0} = R_{34}\left(\frac{E_F}{R}\right) \tag{10}$$

and $$R_{34} = R\left(\frac{E_{34_0}}{E_F}\right) \tag{11}$$

The current through resistor 34 at any instant is given by the general equation $$I = E_S/R \tag{12}$$

Substituting Equation 12 into Equation 5 we have for the generalized signal to the recorder:

$$E_{34} = R_{34} E_S / R \tag{13}$$

Substituting Equation 11 into 13:

$$E_{34} = E_S E_{34_0} / E_F \tag{14}$$

The change in signal ($\Delta E$) to the recorder is the instantaneous signal less the initial signal. Thus:

$$\Delta E = E_{34} - E_{34_0} \tag{15}$$

Substituting (14) into (15):

$$\Delta E = \frac{E_S E_{34_0}}{E_F} - E_{34_0} \tag{16}$$

$$= E_{34_0}\left(\frac{E_S - E_F}{E_F}\right) \tag{17}$$

Substituting Equation 1 into 17 and simplifying we find that $$\Delta E = E_{34_0}\left(\frac{E_S - E_R}{E_S + E_R}\right) \tag{18}$$

Since the signals $E_S$ and $E_R$ are proportional to $I_{11}$ and $I_1$ respectively and since $E_{34_0}$ once set is a constant, we note that the change in signal to the recorder is equal to the polarization ratio since $$\Delta E = K\left(\frac{I_{11} - I_1}{I_{11} + I_1}\right) \tag{19}$$

Let it be assumed that the recorder indicates zero when $E_{34} = 0$ and indicates 100% when $E_{34} = 1$. If we now adjust the recorder to read 50% under the initial conditions when the analyzers are set in the same plane $E_{34_0}$ will equal ½. From Equation 15 and recorder signal $E_{34}$ is $$E_{34} = E_{34_0} + \Delta E \tag{20}$$

From Equations 18, 19 and 20 we see that $$E_{34} = E_{34_0} + E_{34_0}\left(\frac{I_{11} - I_1}{I_{11} + I_1}\right) \tag{21}$$

If we set $E_{34_0}$ to ½ such that the recorder reads 50% it is noted that when the parallel component $I_{11}$ goes to extinction $E_{34}$ goes to 0 and that when the perpendicular component $I_1$ goes to extinction $E_{34} = 1$. Thus the recorder is capable of recording both positive and negative values of the polarization ratio.

We now have a system which will record the polarization ratio of fluorescent radiation from an excited sample directly as a function of time, wavelength of exciting radiation and in which, by the utilization of a second monochromator in the fluorescent path, as a function of the fluorescent radiation wavelength.

The presence of the polarizer in the excitation radiation beam path is not essential to a practice of the invention. The presence of this polarizer does, however, aid in reducing some ambiguities which might otherwise occur. It is obvious that by the utilization of a pair of similar adapters with the analyzers set at 90° one to another and by only minor modification of the ratio recording circuitry, a prior art ratio recording spectrophotometer may be made to provide directly a record of the polarization ratio. Obviously many modifications and variations will be apparent to those skilled in the art to which the invention pertains and it is to be understood that, within the spirit and scope of the appended claims, the invention may be practiced otherwise than as specifically described.

What is claimed is:

1. A radiant energy analyzer comprising:
    a source of radiant energy;
    beam switching means for switching radiation from said source along alternate beam paths and recombining radiation in said paths along a common path;
    first and second means for containing a sample respectively in said beam paths and for directing fluorescent radiation from said respective samples along said alternate beam paths, said first and second means each including an alayzer;
    detector means receiving radiant energy from said common path and providing an electrical signal output having first and second components respectively proportional to the radiant energy in said alternate beam paths;
    first and second signal channel means including means for storing said first and second components;
    circuit means interconnecting said first and second signal channel means for providing a signal varying as a function of the average intensity of the radiation in said alternate beam paths;
    feedback means connected to said detector and operable to maintain said average signal substantially constant whereby the signal in one of said channels is proportional to the ratio of the intensity difference in said beam paths to the sum thereof.

2. A radiant energy analyzer comprising.
    means producing excitation radiation of a selected wavelength for exciting a sample;
    beam switching means for switching radiation from said source means alternately along first and second beam paths and recombining radiation traversing said paths along a common path;
    first and second cell means in said respective beam paths positioned to receive radiation from said source means;
    first and second analyzer means positioned to receive fluorescent radiation from respective ones of said cell means and direct said fluorescent radiation along said respective beam paths;
    detector means receiving radiation from said common path and providing an electrical signal output having first and second components respectively proportional to the radiant energy in said alternate beam paths;
    first and second electrical channels;
    sorting means interconnecting said detector means and said first and second electrical channels and separating said first and second components respectively to said first and second channels whereby first and second electrical signals are provided in said channels respectively proportional to the intensity of radiation passing said analyzers;
    circuit means interconnecting said electrical channels and providing a signal varying as a function of the average intensity of the radiation in said alternate beam paths;
    feedback means interconecting said circuit means and said detector and operable to maintain said average signal substantially cnstant;
    means connected to one of said channels for indicating the change in signal therein whereby the ratio of the difference in intensity in said beam paths to the sum thereof may be recorded.

3. The radiant energy analyzer of claim 2 wherein said source means includes a polarizer and said first and second analyzers are set respectively parallel and perpendicular to the plane of the plane-polarized excitation radiation.

References Cited

UNITED STATES PATENTS

| | | |
|---|---|---|
| 2,540,780 | 2/1951 | Gabel et al. |
| 3,071,037 | 1/1963 | Brumley. |
| 3,327,117 | 6/1967 | Kamentsky. |

ARCHIE R. BORCHELT, *Primary Examiner.*

U.S. Cl. X.R.

88—14; 250—71, 83.3

UNITED STATES PATENT OFFICE
CERTIFICATE OF CORRECTION

Patent No. 3,443,089   May 6, 1969

Karl Erik Sundstrom

It is certified that error appears in the above identified patent and that said Letters Patent are hereby corrected as shown below:

Column 3, line 3, "appropirate" should read -- appropriate --; line 70, equation (5) should read -- $E_{34} = R_{34}I$ --; line 75, equation (6) should read -- $E_{34_o} = R_{34}I_o$ --. Column 4, line 2, "$E_s$" should read -- $E_S$ --; line 29, equation (14) should read $$E_{34} = \frac{E_S E_{34_o}}{E_F}$$

same column 4, line 57, "and" should read -- the --.

Signed and sealed this 14th day of April 1970.

(SEAL)
Attest:

EDWARD M. FLETCHER, JR.
Attesting Officer

WILLIAM E. SCHUYLER, JR.
Commissioner of Patents